(12) United States Patent
Patel et al.

(10) Patent No.: US 8,113,468 B2
(45) Date of Patent: Feb. 14, 2012

(54) PRECISION ATTITUDE CONTROL SYSTEM FOR GIMBALED THRUSTER

(75) Inventors: Moonish R. Patel, Fremont, CA (US); Neil E. Goodzeit, Princeton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 13/165,655

(22) Filed: Jun. 21, 2011

(65) Prior Publication Data

US 2011/0248120 A1    Oct. 13, 2011

Related U.S. Application Data

(62) Division of application No. 12/639,937, filed on Dec. 16, 2009, now Pat. No. 7,988,097, which is a division of application No. 10/522,576, filed as application No. PCT/US2004/033736 on Oct. 14, 2004, now Pat. No. 7,654,490.

(60) Provisional application No. 60/511,238, filed on Oct. 14, 2003.

(51) Int. Cl.
*B64G 1/26*    (2006.01)
*B64G 1/28*    (2006.01)

(52) U.S. Cl. ..................... 244/165; 244/169

(58) Field of Classification Search ............ 244/164, 244/165, 169, 170, 171, 158.8, 171.1, 171.2
See application file for complete search history.

(56) References Cited

U.S. PATENT DOCUMENTS

| 6,032,904 | A  | 3/2000  | Hosick et al. |
| 6,116,543 | A  | 9/2000  | Koppel |
| 6,213,432 | B1 | 4/2001  | Koppel |
| 6,441,776 | B1 | 8/2002  | Hein et al. |
| 6,481,672 | B1 | 11/2002 | Goodzeit et al. |
| 6,616,104 | B1 | 9/2003  | Cheng et al. |
| 6,622,969 | B2 | 9/2003  | Yamashita |
| 6,637,701 | B1 | 10/2003 | Glogowski et al. |
| 6,695,263 | B1 | 2/2004  | Goodzeit |
| 6,702,234 | B1* | 3/2004 | Goodzeit ............... 244/164 |
| 6,845,950 | B1 | 1/2005  | Goodzeit et al. |
| 6,870,164 | B1 | 3/2005  | Baldwin et al. |
| 7,124,001 | B2 | 10/2006 | Li et al. |
| 7,464,898 | B1 | 12/2008 | Goodzeit et al. |
| 7,835,826 | B1* | 11/2010 | Weigl et al. ............. 701/4 |

* cited by examiner

*Primary Examiner* — Tien Dinh
(74) *Attorney, Agent, or Firm* — McDermott Will & Emery LLP

(57) ABSTRACT

A system for providing attitude control with respect to a spacecraft is provided. The system includes a reaction wheel control module configured to control a number of reaction wheel assemblies associated with the spacecraft in order to control attitude, and a maneuver control module configured to use a number of gimbaled Hall Current thrusters (HCTs) to control the total momentum associated with the spacecraft. The total momentum includes the momentum associated with the reaction wheel assemblies and the angular momentum of the spacecraft. Using the gimbaled HCTs to control the momentum associated with the reaction wheel assemblies results in minimal HCT gimbal stepping.

4 Claims, 8 Drawing Sheets

PRECISION ATTITUDE CONTROL SYSTEM FOR GIMBALED THRUSTER

CROSS-REFERENCES TO RELATED APPLICATION(S)

This application is a divisional application of U.S. patent application Ser. No. 12/639,937, filed on Dec. 16, 2009, which is a divisional application of U.S. patent application Ser. No. 10/522,576, accorded a 35 U.S.C. §371(c) date of Jan. 28, 2005, which is a National Stage application of International Application No. PCT/US2004/033736, filed Oct. 14, 2004, which claims the benefit of priority under 35 U.S.C. §119 from U.S. Provisional Patent Application Ser. No. 60/511,238, entitled "PRECISION ATTITUDE CONTROL SYSTEM FOR HALL CURRENT THRUSTER (HCT)," filed on Oct. 14, 2003, all of which are hereby incorporated by reference in their entirety for all purposes.

BACKGROUND OF THE INVENTION

The present invention generally relates to gimbaled thrusters and more particularly to methods and systems for providing attitude and momentum control during gimbaled thruster firing for orbit transfer and stationkeeping maneuvers.

Gimbaled thrusters (including Hall Current Thrusters (HCTs)) are used by spacecraft, such as military communications spacecraft, to perform partial orbit transfer. The HCTs, which are much more fuel-efficient than chemical thrusters, enable as much as 500 kg of additional payload to be delivered to the mission orbit.

When used for orbit transfer, the HCTs are fired continuously for several months while the spacecraft attitude is controlled to track an optimal trajectory vector. The attitude control system maintains alignment of the HCT thrust axis and simultaneously rotates the spacecraft for solar array sun pointing. While the HCT fires, fuel-efficient attitude control is required, so the firing of the chemical thrusters (e.g., REAs) for attitude control is not viable. Furthermore, the HCTs are typically mounted on gimbaled platform so that their orientations may be actively modulated to generate control torques. The drawback of using the gimbaled HCTs directly for attitude control is that the resulting gimbal steps (e.g., >10×10$^6$) may exceed the life capability of the mechanisms.

Hence, it would be desirable to provide a system that is able to provide more efficient attitude and momentum control during HCT firings for orbit transfer and stationkeeping maneuvers.

SUMMARY OF THE INVENTION

In one exemplary embodiment, a simple control arrangement is provided which uses both reaction wheel assemblies (RWAs) and gimbaled HCTs for attitude and momentum control. The RWAs provide attitude control and the gimbaled HCTs are used to adjust the total momentum of a spacecraft. The total momentum includes the RWA momentum and the angular momentum of the spacecraft. This results in precision attitude control with minimal HCT gimbal stepping (roughly 430,000 steps required for a typical orbit transfer). The control arrangement provides precision attitude control and accommodates orbit transfer trajectory tracking and slewing as well as on-station maneuver operations.

In another exemplary embodiment, a system for providing attitude control with respect to a spacecraft is provided. The system includes a reaction wheel control module configured to control a number of reaction wheel assemblies associated with the spacecraft in order to control attitude, and a maneuver control module configured to use a number of gimbaled Hall Current thrusters (HCTs) to control the momentum associated with the reaction wheel assemblies during an orbit transfer. Using the gimbaled HCTs to control the momentum associated with the reaction wheel assemblies during the orbit transfer results in minimal HCT gimbal stepping.

The maneuver control module further includes a momentum adjust module and a gimbal module. The momentum adjust module is configured to receive information relating to the speed of the reaction wheel assemblies and a momentum command as input and generate a number of outputs including a first output relating to a reaction wheel momentum adjust torque, a second output relating to a thruster momentum adjust torque and a third output relating to an integral momentum adjust torque. The gimbal module is configured to use the second and third outputs from the momentum adjust module to generate a number of outputs including a first output relating to a HCT torque deficit and a second output to be used to control the gimbaled HCTs. The reaction wheel control module is configured to use the first outputs from the momentum adjust module and the gimbal module respectively to generate an output to be used to control the reaction wheel assemblies.

The present invention may provide a number of advantages and benefits. For example, the present invention does not rely on direct attitude control using gimbaled HCTs which would result in gimbal stepping in excess of mechanism capability. Also, the present invention does not require the use of low-ISP thrusters (such as REAs) for RWA momentum adjustment. The present invention is versatile and robust and can accommodate trajectory tracking, slewing and on-station maneuvers, all with the same control logic. Using gimbaled HCTs for momentum adjustment allows larger control torques to be applied than would be otherwise possible using RWAs alone, which is a benefit for tracking high-acceleration trajectories. The present invention has the further advantages of ensuring low RWA speeds are maintained at all times, without the need for inefficient chemical thruster momentum adjust maneuvers. Another advantage is that the present invention can be used for both orbit transfer and mission orbit stationkeeping maneuvers. Based on the disclosure and teachings provided herein, a person of ordinary skill in the art will realize other advantages and benefits provided by the present invention.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

Figure 1:
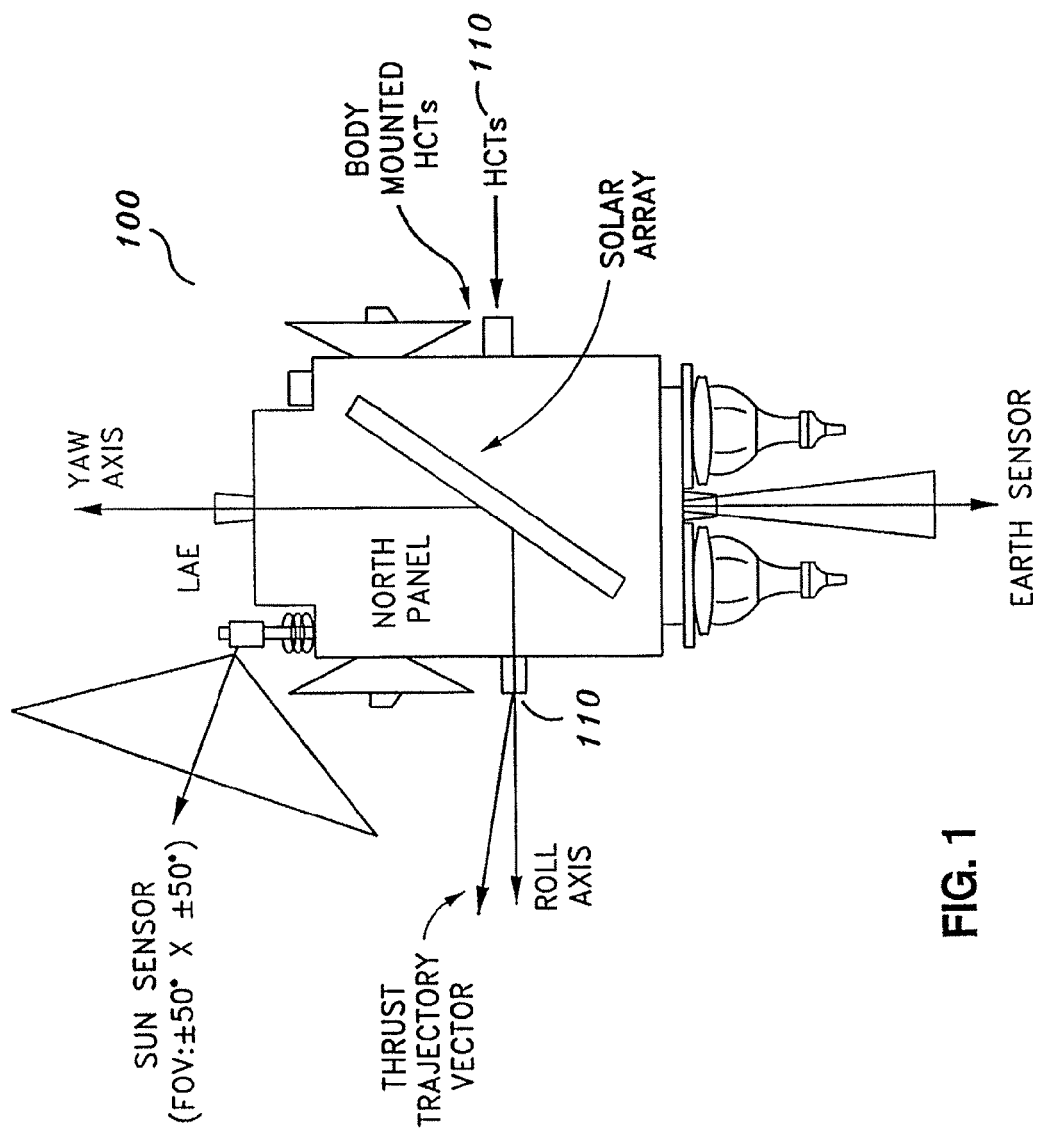
FIG. 1 is a simplified schematic diagram illustrating an exemplary embodiment of the present invention.

The present invention in the form of one or more exemplary embodiments will now be described. FIG. 1 illustrates one exemplary embodiment of the present invention. FIG. 1 shows a spacecraft 100 that includes a complement of four (4) HCTs each mounted on its own two-axis gimbaled platform. The spacecraft 100 includes a satellite and other types of space-based vehicles. HCTs 110 are mounted at the corner of the north and east faces and at the corner of the north and west faces. Two (2) more HCTs (not shown) are similarly mounted on the south side of the spacecraft 100. Based on the disclosure and teachings provided herein, a person of ordinary skill in the art will know of other possible HCT arrangements that can be used with the present invention. In an alternative arrangement, referred to as an "aft mounted" arrangement, four (4) HCTs are mounted on the aft end of the spacecraft (adjacent to the LAE (Liquid Apogee Engine) face or base panel), with two (2) HCTs mounted on a gimbaled platform on the north side of the spacecraft and two (2) mounted on a platform on the south side of the spacecraft.

Figure 2:
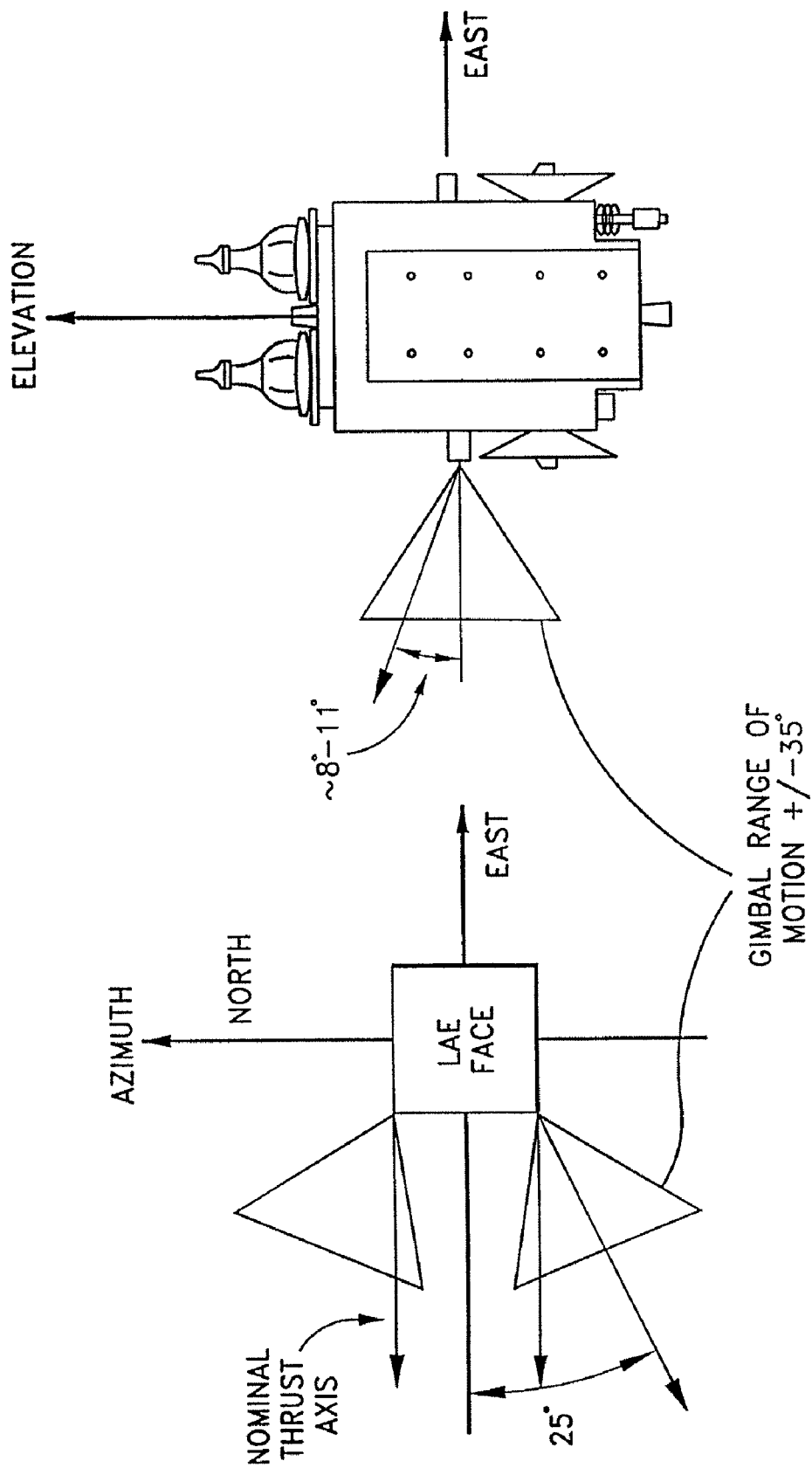
FIG. 2 is a simplified schematic diagram showing a two-axis gimbaled HCT range of motion of ±35 degrees in both the azimuth and the orthogonal elevation directions for the spacecraft as illustrated in FIG. 1.

FIG. 2 shows a two-axis gimbaled HCT range of motion of ±35 degrees in both the azimuth and the orthogonal elevation directions for the spacecraft 100 as illustrated in FIG. 1.

Figure 3:
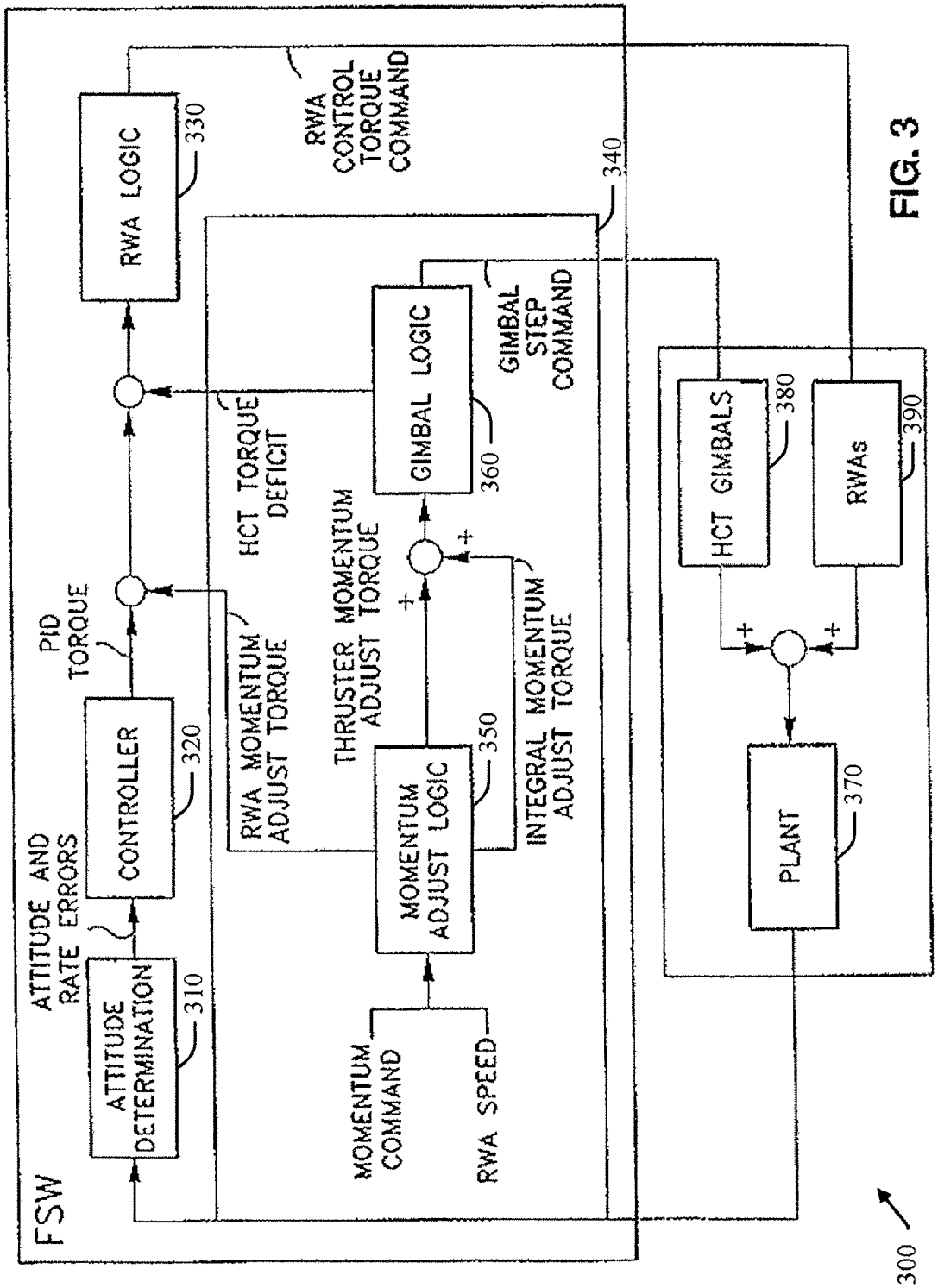
FIG. 3 is a simplified block diagram illustrating an attitude control system according to one embodiment of the present invention.

FIG. 3 illustrates an attitude control system according to one embodiment of the present invention. In one embodiment, the system 300 is implemented in the form of spacecraft flight software which resides on a computer-readable medium executable by a processor onboard of the spacecraft 100. The spacecraft 100 as shown in FIG. 1 includes an attitude sensing complement with a number of sensors including, for example, earth sensors, sun sensors, and a continuously operating IMU (inertial measurement unit), which provides three-axis angular rate data. The gyro data is used to propagate the transformation from inertial-to-body coordinates. This inertial reference information is updated during portions of the orbit where the earth and/or sun sensor data is available.

As shown in FIG. 3, the attitude determination logic ("AD Logic") 310 includes attitude sensing and processing logic. The AD Logic 310 receives input from the plant 370. The plant 370 represents the dynamics of the spacecraft 100 including various components. Using information received from the plant, the AD Logic 310 generates filtered attitude and rate errors that are the input to a Proportional-Integral-Derivative ("PID") controller 320. The PID controller 320 computes body-frame torque that is forwarded to the RWA logic ("RWA Logic") 330. The RWA Logic 330, in turn, computes RWA control torque command(s) for attitude control that are then used to properly adjust the RWAs 390.

During the HCT orbit transfer, either the east or the west pair of HCTs may fire. The attitude and rate errors are generated by the AD Logic 310, such that when they are nulled by the system 300, the spacecraft attitude tracks a target reference frame generated based on an optimal thrust trajectory vector. By tracking the target reference frame, the nominal HCT thrust axis remains properly aligned and the mission orbit is gradually achieved over time. Target reference frame tracking also causes the spacecraft 100 to rotate about the nominal HCT thrust vector. Concurrently, the system 300 actively controls the solar array orientation to maintain solar array sun pointing, thereby providing electrical power to operate the spacecraft 100 and the HCTs 110.

When the HCTs are fired to achieve orbit transfer, the maneuver logic ("Maneuver Logic") 340 operates to control the total momentum while allowing the proper attitude to be achieved with respect to the spacecraft 100. The total momentum includes the RWA momentum and the angular momentum of the spacecraft 100. In one implementation, the Maneuver Logic 340 includes momentum adjust logic ("Momentum Adjust Logic") 350 and gimbal logic ("Gimbal Logic") 360. Using the commanded RWA momentum and the measured RWA speeds, both of which are typically measured and calculated by instruments of the spacecraft 100, the Maneuver Logic 340 generates a number of different outputs including, for example, RWA momentum adjust torque, an HCT torque deficit, and HCT gimbal step command(s). These outputs are then used either directly or indirectly to effect control over the HCT gimbals 380 and the RWAs 390 so as to properly provide attitude control with respect to the spacecraft 100.

As shown in FIG. 3, using information relating to the RWA momentum and speed, the Momentum Adjust Logic 350 generates the thruster momentum adjust torque and the integral momentum adjust torque, both of which are then provided to the Gimbal Logic 360. The Gimbal Logic 360, in turn, generates the gimbal step command(s) that are then used to control the HCT gimbals 380 to provide the proper torque.

In addition, the Gimbal Logic 360 and the Momentum Adjust Logic 350 also generate the HCT torque deficit and the RWA momentum adjust torque respectively. This together with the PID torque from the PID controller 320 are provided to the RWA Logic 330. In response, the RWA Logic 330 generates the RWA control torque command(s) that are then used to control the RWAs 390 to provide the proper attitude.

As a result, during an HCT orbit transfer, the HCT gimbals 380 and the RWAs 390 are collectively adjusted by the system 300 to provide more precise attitude control with respect to the spacecraft 100.

Figure 4:
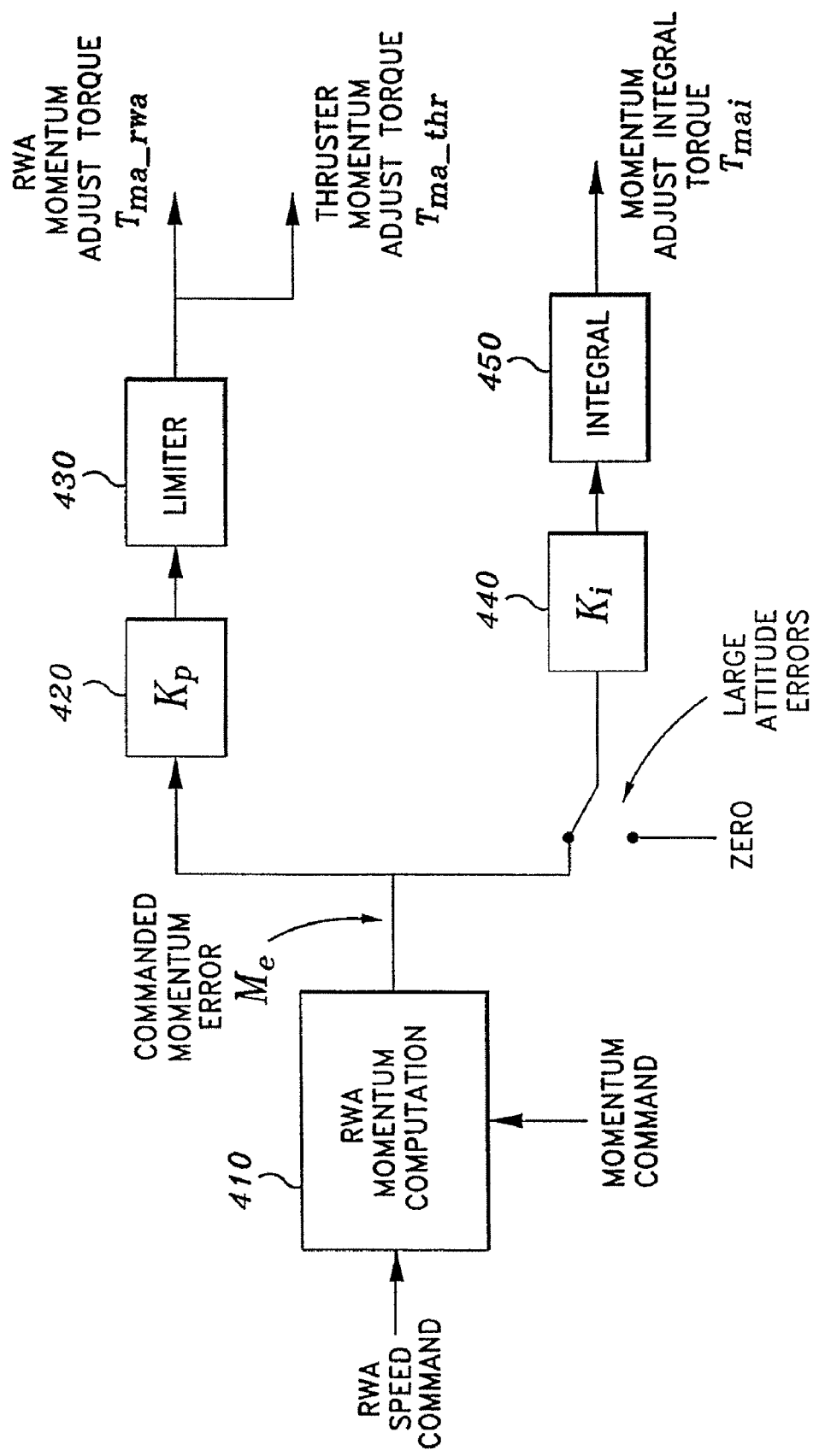
FIG. 4 is a simplified block diagram illustrating the momentum adjust logic according to one embodiment of the present invention.

FIG. 4 shows one embodiment of the Momentum Adjust Logic 350. In block 410, the RWA momentum is computed from the RWA speeds. The RWA momentum is then subtracted from the momentum command(s) to generate the commanded momentum error $M_e$. The momentum error $M_e$ is used to compute the RWA momentum adjust torque $T_{ma\_rwa}$, which is equal to the thruster momentum adjust torque $T_{ma\_thr}$. The momentum error $M_e$ is also used to compute the momentum adjust integral torque $T_{mai}$.

As shown in FIG. 4, the parameters $K_p$ and $K_i$ are proportional and integral control gains respectively. The limiter logic 430 is used to limit the magnitude of the output of the $K_p$ logic 420 if the output exceeds a predetermined threshold. The integral logic 450 is used to compute a discrete time integral of the output of the $K_i$ logic 440. When the attitude error exceeds a predetermined threshold, the output of the $K_i$ logic 440 is set to zero and, hence, the momentum adjust integral torque $T_{mai}$, remains constant.

Referring back to FIG. 3, the RWA momentum adjust torque is summed with the RWA attitude control torque (PID torque) for input to the RWA Logic 330. The thruster momentum adjust torque and the momentum adjust integral torque are summed and input to the Gimbal Logic 360. The application of the RWA momentum adjust torque causes the RWA momentum error to decrease. Applying the thruster momentum adjust torque causes a counteracting torque to be simultaneously applied to the spacecraft 100 by the gimbaled HCTs 380. Hence. During momentum adjust, the net torque is or close to zero. The effect is to reduce the RWA momentum error with almost no impact on the spacecraft attitude pointing. It will be appreciated and understood by those skilled in the art that the purpose of the integral term is to null the HCT disturbance torque and drive the steady-state RWA momentum error to zero. In the absence of an attitude control torque demand (i.e., zero PID torque), the integral term will drive the HCT gimbals to their zero-torque orientations.

Figure 5:
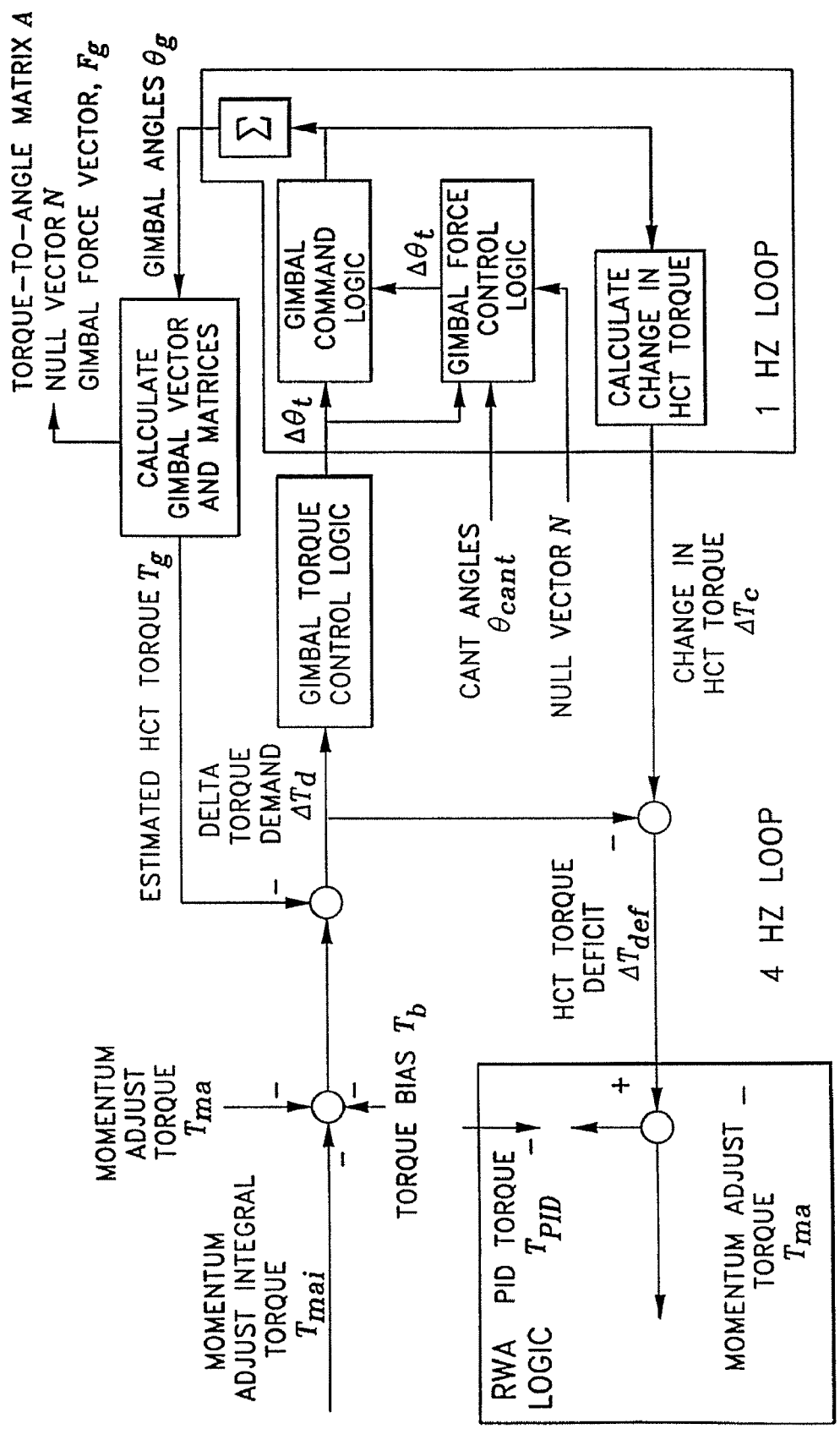
FIG. 5 is a simplified block diagram illustrating the gimbal logic according to one embodiment of the present invention.

FIG. 5 illustrates one embodiment of the Gimbal Logic 360. The Gimbal Logic 360 is used to generate the gimbal step command(s) and the HCT torque deficit RWA torque demand. Additional details regarding the Gimbal Logic 360 can be found in U.S. Pat. No. 6,481,672 (by Ratan and Goodzeit), which is incorporated in its entirety by reference herein. The Gimbal Logic 360 operates as follows. The estimate HCT gimbal torque $T_g$ is subtracted from the input torque demand (the sum of the momentum adjust torque and integral torque demands) and the delta torque demand $\Delta T_d$ is input to the gimbal torque control logic. The gimbal torque control logic computes the change in the HCT gimbal angles $\Delta \theta_t$ (delta gimbal angles) to achieve the requisite delta torque. Additional logic may modify the gimbal delta angles to maximize the net HCT thrust in a desired body-frame direction.

The gimbal command logic is used to compute the gimbal steps that are necessary to achieve the desired delta gimbal torque, and the gimbal step demand is input to the gimbal drive electronics to achieve the change in gimbal angles. In addition, the gimbal angle equivalent to the step demand is used to update the knowledge of the gimbal positions $\theta_g$ for use in the next processing cycle. Finally, the commanded delta torque $\Delta T_d$ is subtracted from the expected change in the HCT torque $\Delta T_c$ (based on the commanded gimbal steps) to get the HCT torque deficit $\Delta T_{def}$. By summing the torque deficit with the RWA torque demand, the total RWA momentum adjust torque is reduced. This prevents attitude transients by maintaining consistency between the applied RWA momentum adjust torque and the HCT gimbal torque.

Figure 6:
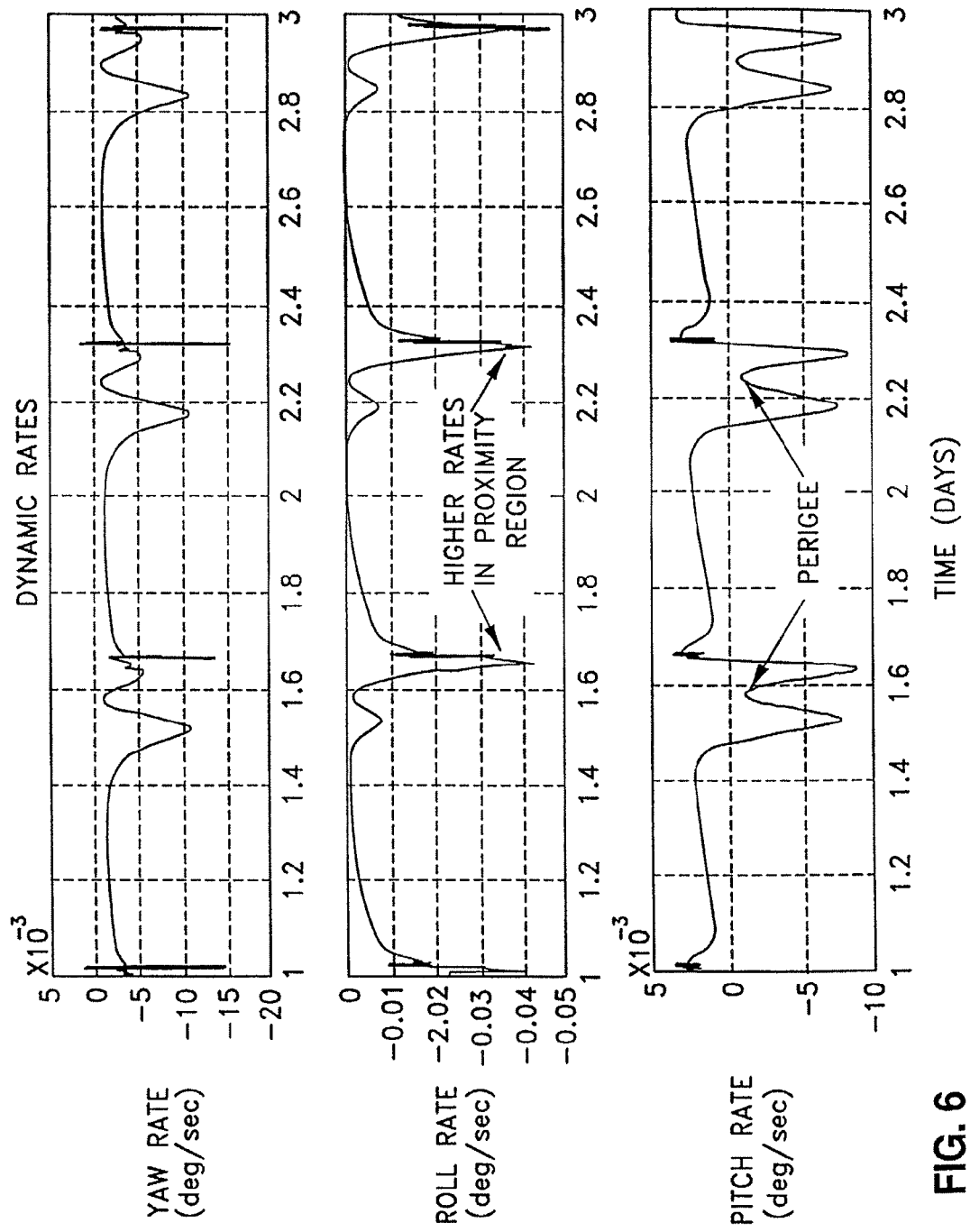
FIG. 6 is a graph illustrating HCT orbit transfer spacecraft body rates according to one embodiment of the present invention.
Figure 7:
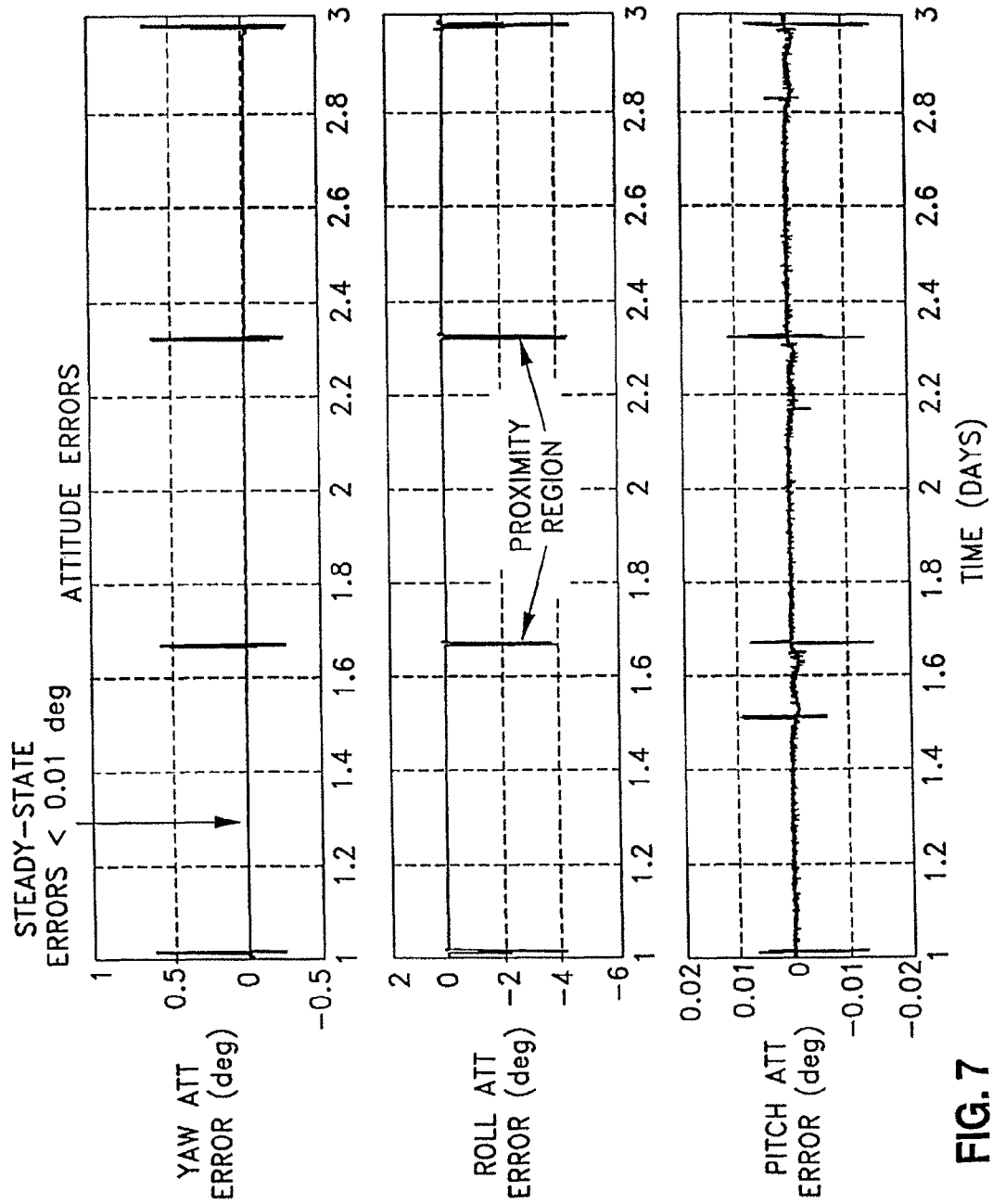
FIG. 7 is a graph illustrating HCT orbit transfer spacecraft attitude errors according to one embodiment of the present invention.
Figure 8:
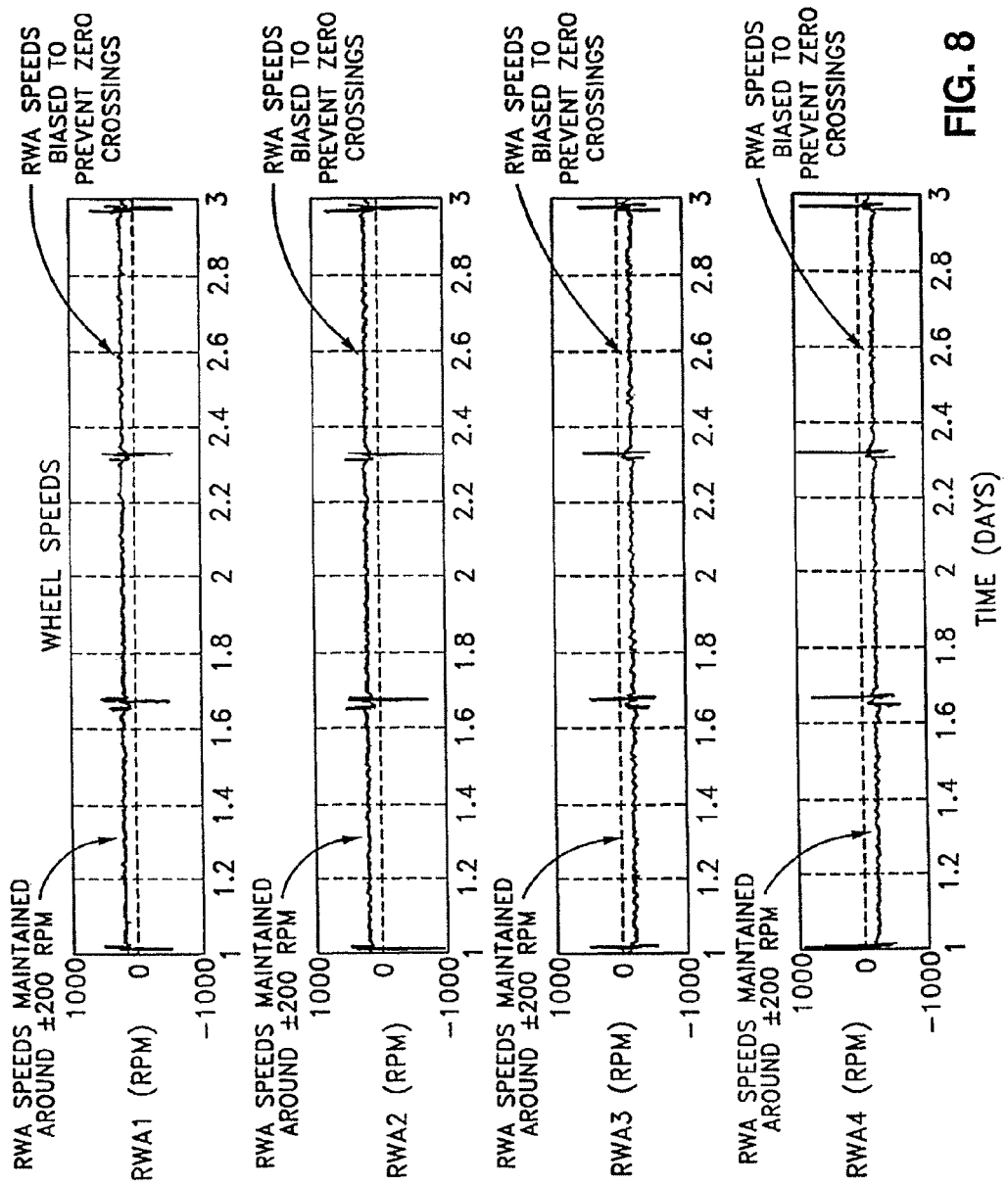
FIG. 8 is a graph illustrating HCT orbit transfer spacecraft RWA speeds according to one embodiment of the present invention.

FIGS. 6, 7 and 8 are various graphs showing information relating to a two-day portion of an HCT orbit transfer for a spacecraft that includes a system according to one embodiment of the present invention. FIG. 6 shows the spacecraft body rates. FIG. 7 shows the attitude errors relative to the commanded target reference frame. FIG. 8 shows the RWA speeds. FIG. 8 shows that the RWA speeds are maintained well below 1000 rpm at all times, which is well within their allowable operating speed range of ±6500 rpm. Also, high accuracy attitude control is maintained, with steady-state errors of less than 0.01 degrees. The only exceptions are when the trajectory transitions through the proximity region, where the angular separation between the thrust trajectory vector and the sun vector is less than 30 degrees. In this region, to maintain solar array sun pointing, large RWA torques may be applied to rotate the spacecraft about the HCT thrust axis. Despite the need for larger torques, low RWA speeds are maintained using the present invention, and because the proximity region encounters are brief and the attitude error is about the thrust axis, there is little impact on overall orbit transfer performance. Because the momentum error is a low bandwidth and low noise signal, there is very little chattering of the HCT gimbals. For this two-day simulation, the total number of gimbal steps is roughly 8600, which translates to 1 step every 20 seconds.

Based on the disclosure and teachings provided herein, it should be understood that the present invention can be used in a variety of applications including, for example, commercial and/or government spacecraft programs. A person of ordinary skill in the art will appreciate other ways and/or methods to deploy the present invention in different types of applications.

It should be understood that the present invention as described above can be implemented in software, hardware, or a combination of both, in the form of control logic in a modular or integrated manner. Based on the disclosure and teachings provided herein, a person of ordinary skill in the art will appreciate other ways and/or methods to implement the present invention.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A satellite comprising:
    a plurality of reaction wheel assemblies configured to provide attitude for the satellite;
    a plurality of gimbaled thrusters; and
    flight logic configured to control the plurality of reaction wheel assemblies and the plurality of gimbaled thrusters, to direct the plurality of reaction wheel assemblies to provide proper attitude for the satellite, and to use the plurality of gimbaled thrusters to control a total momentum of the satellite, the total momentum including the momentum associated with the plurality of reaction wheel assemblies; wherein the flight logic includes:
    a reaction wheel control module configured to control the plurality of reaction wheel assemblies; and
    a maneuver control module configured to use the plurality of gimbaled thrusters to control the momentum associated with the plurality of reaction wheel assemblies;
    wherein the maneuver control module further includes a momentum adjust module and a gimbal module;
    wherein the momentum adjust module is configured to receive information relating to the speed of the plurality of reaction wheel assemblies and a momentum command as input and generate a plurality of outputs including a first output relating to a reaction wheel momentum adjust torque, a second output relating to a thruster momentum adjust torque and a third output relating to an integral momentum adjust torque;
    wherein the gimbal module is configured to use the second and third outputs from the momentum adjust module to generate a plurality of outputs including a first output relating to a torque deficit and a second output to be used to control the plurality of gimbaled thrusters; and
    wherein the reaction wheel control module is configured to use the first outputs from the momentum adjust module and the gimbal module respectively to generate an output to be used to control the plurality of reaction wheel assemblies.

2. The satellite of claim 1, wherein using the plurality of gimbaled thrusters to control the momentum associated with the plurality of reaction wheel assemblies results in minimal gimbal stepping.

3. The satellite of claim 1, wherein the flight logic resides on a computer-readable medium executable by a processor onboard the satellite.

4. A satellite comprising:
a plurality of reaction wheel assemblies configured to provide attitude for the satellite;
a plurality of gimbaled thrusters;
flight logic configured to control the plurality of reaction wheel assemblies and the plurality of gimbaled thrusters, to direct the plurality of reaction wheel assemblies to provide proper attitude for the satellite, and to use the plurality of gimbaled thrusters to control a total momentum of the satellite, the total momentum including the momentum associated with the plurality of reaction wheel assemblies;
and wherein the flight logic is further configured to direct the plurality of reaction wheel assemblies to effect a desired attitude of the satellite based on a torque deficit of the plurality of gimbaled thrusters, and wherein the torque deficit is based on an expected gimbaled thruster torque minus a commanded gimbaled thruster torque.

* * * * *